BEST AVAILABLE COPY

Dec. 28, 1926.

J. H. HUNT 1,612,726

MAGNETO

Filed Oct. 24, 1923

Inventor
John H. Hunt
By Spencer Sewall and Hardman
His Attorneys

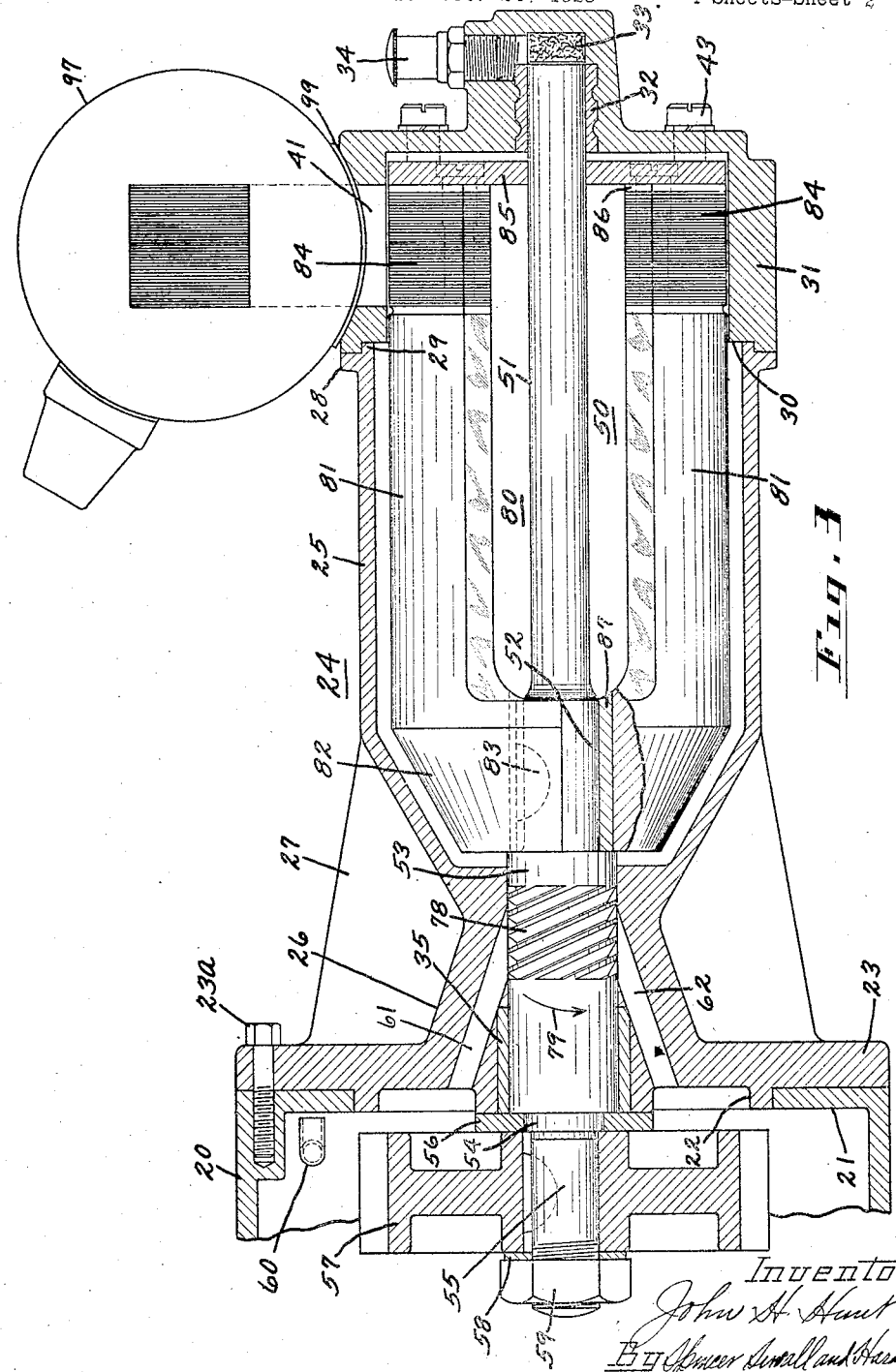

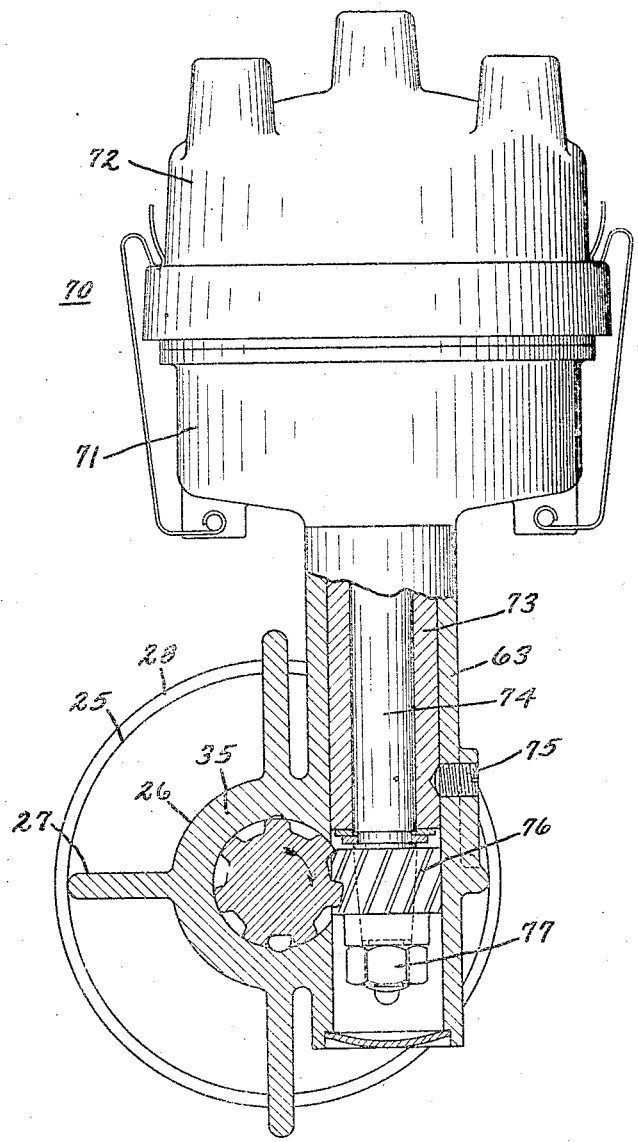

Dec. 28, 1926.

J. H. HUNT 1,612,726

MAGNETO

Filed Oct. 24, 1923  4 Sheets-Sheet 4

Inventor
John H. Hunt
By Spencer Sewall and Hardman
His Attorneys

Patented Dec. 28, 1926.

1,612,726

UNITED STATES PATENT OFFICE.

JOHN H. HUNT, OF DAYTON, OHIO, ASSIGNOR TO GENERAL MOTORS RESEARCH CORPORATION, OF DAYTON, OHIO, A CORPORATION OF DELAWARE.

MAGNETO.

Application filed October 24, 1923. Serial No. 670,616.

This invention relates to magnetos and particularly to magnetos which are adapted to supply ignition for internal-combustion engines.

Among the objects of the invention are the simplification of the construction of magnetos whereby the number of parts is reduced and economy in manufacture is obtained; and the provision of such improvements in construction as are conducive to durability and efficient operation.

Further objects and advantages of the present invention will be apparent from the following description, reference being had to the accompanying drawings, wherein preferred forms of embodiment of the present invention are clearly shown.

In the drawings:

Fig. 3 is a sectional view on the line 3—3 of Fig. 1.

Fig. 4 is a sectional view on the line 4—4 of Fig. 1.

Figure 1:
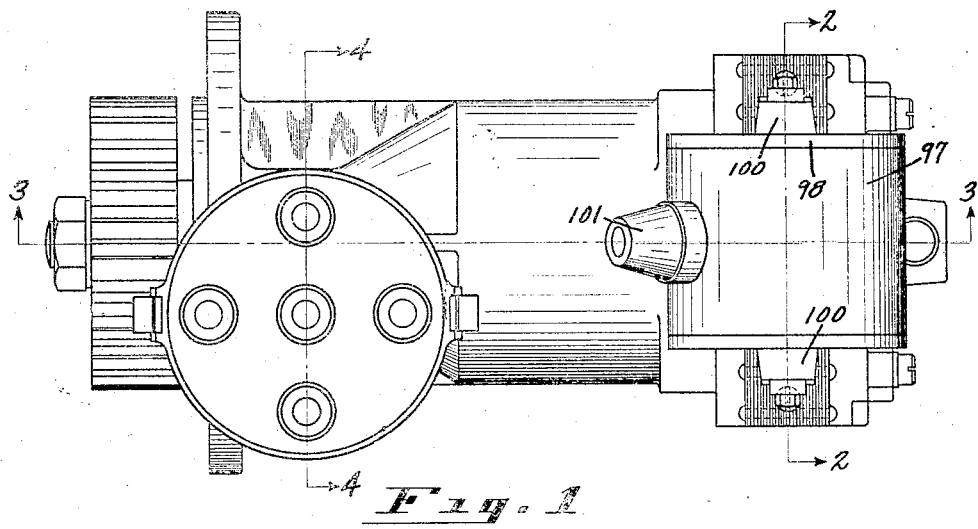
Fig. 1 is a plan view of a magneto embodying one form of the invention.
Figure 2:
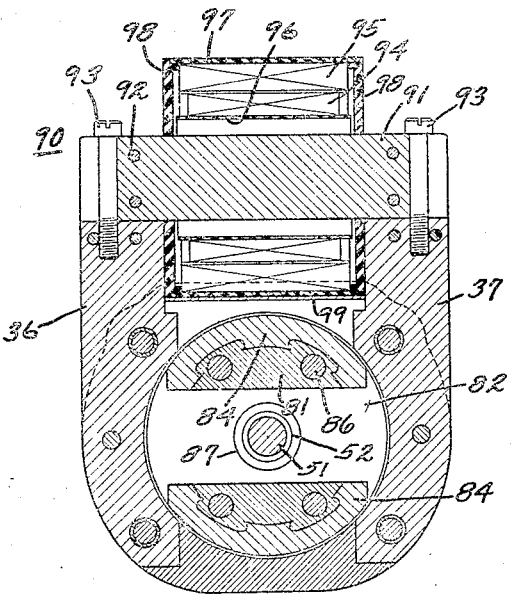
Fig. 2 is a sectional view on the line 2—2 of Fig. 1.
Figure 6:
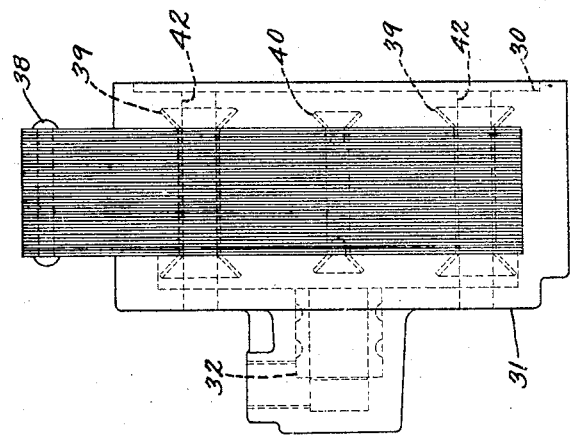
Fig. 6 is a side view thereof.
Figure 5:
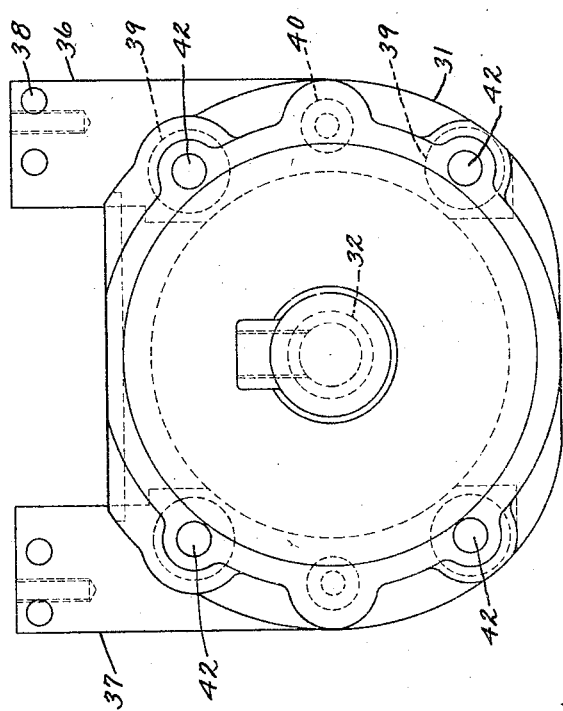
Fig. 5 is an end view on an enlarged scale of one of the magneto frame members which supports the magneto armature.

In the drawings, 20 designates the frame of a machine such as an internal-combustion engine which is supplied with ignition by the magneto. The wall 21 of frame 20 is provided with a circular opening for receiving the annular boss 22, extending from a mounting flange 23 formed integrally with the non-magnetic magneto frame member 24. Frame 24 includes a bell-shaped housing 25 joined to the mounting flange 23 by hub 26 and a plurality of ribs 27. The mounting flange 23 is attached to the machine frame 20 in any convenient manner, such as by bolts, one being shown at 23ª.

The rim of the bell-shaped housing 25 is provided with a flange 28 having an annular extension 29 which is received by recess 30 provided in the cover 31 of the housing 25. The cover member 31 is provided with a bearing 32 lubricated by a felt disk 33 which is supplied with lubricant through an oiler 34. The bearing 32 is maintained in alinement with the bearing 35 in the hub 26 of rim 24 by means of the engagement of the annular boss 29 with the recess 30, said boss and recess being concentric with the bearings 32 and 35.

The cover 31 includes two laminated pole pieces 36 and 37 which are joined together by solid rivets 38, hollow rivets 39 and solid rivets 40. Rivets 39 and 40 have tubular end portions which are flared outwardly to anchor the pole pieces to the metal of the non-magnetic cover member 31. The pole pieces 36 and 37 are placed in a mold so that their arcuate inner faces are in alinement and are located the same distance from a common center of curvature. Then the molten metal for forming the member 31 is poured into the mold around the pole pieces in order to form when hardened a substantially cup-shaped cover member having an opening 41 through one side thereof between projecting portions of the pole pieces 36 and 37. Bearing member 32 may be located in position by casting the metal of the cover around it. The cover 31 is provided with openings 42 in alinement with the openings in the anchoring rivets 39. Bolts 43 pass through the holes 42 and are threaded into the housing 25 for the purpose of attaching the cover 31 to the housing 25.

The magneto shaft 50 (see Fig. 3) includes portions of various diameters, namely, portion 51 providing a journal for the shaft within the bearing 32, portion 52, portion 53 providing a journal for the shaft within bearing 35, portion 54 and portion 55. The portion 54 receives a thrust washer 56 which is located between one end of the bearing 35 and a gear 57 which is keyed to the portion 55 and is secured by washer 58 and nut 59 engaging threaded end of shaft portion 55.

In case of an internal-combustion engine, the gear 57 may be connected by a gear chain with the timing gears of the engine or may mesh directly with one of said gears. Oil for lubricating the gears is conducted adjacent thereto through a pipe 60. Some of this oil will be conducted through a duct 61, through the hub 26, and the excess will be conducted through duct 62 back to the machine frame which obviously provides a housing for the gear 57.

The hub 26 is provided with a tubular extension 63 located at right angles to the bearing 35. A timer-distributer unit designated as a whole by numeral 70 includes the usual timer circuit breaker distributing apparatus housed within a cup 71 and a distributor head 72. The timer cup 72 includes a tubular shank 73 providing a bearing for a timer shaft 74. The shank 73 is received by the tubular extension 63 and is held in place by a set screw 75. The shaft 74 carries a spiral gear 76 clamped on the tapered end of shaft 74 by a nut 77. The spiral gear 76 meshes with a spiral gear 78 formed on the journal 53 of shaft 50. The direction of rotation of shaft 50 is clockwise, as viewed in Fig. 4, so that the direction of thrust of shaft 50 is toward the right, as viewed in Fig. 3, thereby causing the thrust washer 56 to be engaged by the end of bearing 35 and the hub of gear 57. The direction of rotation of shaft 50 is indicated by the arrow 79 in Fig. 3. It is therefore apparent that oil received by the gear 78 will be pushed toward the left as viewed in Fig. 3. Therefore, during rotation of the shaft in the direction of arrow 79 shown in Fig. 3, the teeth of gear 78 tend to push the oil away from the magnet housing 25.

A permanent horseshoe magnet 80 includes branches 81 having cylindrical outer surfaces and includes a yoke portion 82 attached to the shaft portion 52 by means of a key 83. Each branch 81 is provided with a laminated pole portion 84 which is attached by casting the metal of the magnet in a mold in which laminated pole portions 84 have been located. The free ends of branches 81 are supported by the shaft 51 through the agency of a disk 85 of non-magnetic material attached to the poles 81 by means of screws 86. As shown in Fig. 3, the disk 85 is provided with a hole for receiving the shaft portion 51.

The magneto armature designated in its entirety by numeral 90, includes core 91 having a plurality of laminations bound together by rivets 92 to provide in effect a solid bar having holes for receiving bolts 93 threaded into tapped holes in the armature pole pieces 36 and 37, whereby the core 91 may be detachably secured in position. The armature 90 includes primary coil 94 and the secondary coil 95 arranged concentrically in non-conducting tube 96. These windings enclosed by a case comprise a tubular member 97 and end members 98 which are apertured to receive the core 91. The removability of the core 91 from the armature poles 36 and 37 permits the manufacture of the armature coils and casing as a separate unit through which the core 91 is inserted and then attached to the poles 36 and 37 by the screws 93. The tubular member 97 closes the opening in the cover 31. A sealing plate 99 of non-conducting material is located, as shown in Fig. 3, between the tubular casing member 97 and the cover member 31. The end members 98 of the armature coil housing each carry a primary terminal 100 connected with one end of the primary winding 94; and the outside of the secondary winding 95 is connected with a high tension terminal 101 attached to the tubular member 97.

The primary terminals 100 are connected with the usual timer contacts of the timer-distributor unit 70, and the high tension terminal 101 is connected with the distributing apparatus in the usual manner. Rotation of the armature shaft produces reversals of flux in the stationary magnet circuit which includes the core 91 and poles 36 and 37. These flux reversals cause an alternating current to be produced in the primary winding 94. Approximately at the peaks of the current waves the timer contacts are opened to induce in the secondary winding 95 sparking impulses. These sparking impulses are conducted by suitable conductors (not shown) leading from the high tension terminal 101 to the distributing apparatus of the unit 70, from which these sparking impulses are distributed in the various spark plugs of an engine.

To facilitate providing a hole through the yoke 82 of the magnet, the magnet material is cast around a body 87 of material, softer than the magnet steel. The hole for shaft portion 52 is provided in this body 87.

While the forms of embodiment of the present invention as herein disclosed, constitute preferred forms, it is to be understood that other forms might be adopted, all coming within the scope of the claims which follow.

What I claim is as follows:

1. A magneto comprising, in combination, a rotatable magnet, a magnet housing providing a bearing and a mounting bracket, a cover for said housing providing a bearing, a shaft carrying said magnet and supported by said bearings, and an armature supported by said cover.

2. A magneto comprising, in combination, a rotatable magnet, a magnet housing providing a bearing and a flange mounting at one end of the housing perpendicular to the axis of said bearing, a cover for said housing providing a bearing, a shaft carrying said magnet and supported by said bearings, and an armature supported by said cover.

3. A magneto comprising, in combination, a rotatable magnet, a timer, a shaft supporting and driving the magnet and the timer, a magnet housing providing a bearing for said shaft and supporting the timer, a cover for said housing providing a bearing for said shaft, and an armature supported by said cover.

4. A magneto comprising, in combination, a rotatable magnet, a housing enclosing and supporting said magnet, a magnet shaft journalled in said housing, a timer, spiral gearing connecting the timer and magnet shaft, an oil duct connecting the spiral gear on the magnet shaft with the exterior of the housing, said gear operating to propel lubricant toward said duct.

5. A magneto comprising, in combination, a rotatable magnet, a magnet shaft, a magnet housing supporting said shaft and providing a bearing therefor, and a duct leading from the bearing to the exterior of the housing and means for propelling oil away from the interior of the magnet housing toward said oil duct.

6. A magneto comprising, in combination, an armature having laminated core poles, a rotatable magnet and a magnet housing and end cover therefor supporting the magnet, said cover including non-magnetic material anchored to said poles.

7. A magneto comprising, in combination, an armature having laminated core poles, the laminations being secured together by rivets with flared projecting ends, a rotatable magnet and a magnet housing and cover therefor, said cover including non-magnetic material anchored to said poles by being cast around said rivet projections.

8. A magneto comprising, in combination, an armature having laminated core poles, the laminations being secured together by hollow rivets with flared projecting ends, a rotatable magnet, a magnet housing and cover therefor, said cover including non-magnetic material anchored by being cast in place about said rivet projections, and bolts passing through said hollow rivets for attaching the cover to the housing.

In testimony whereof I hereto affix my signature.

JOHN H. HUNT.